UNITED STATES PATENT OFFICE.

TOBIAS NEW, OF NEW YORK, N. Y.

IMPROVEMENT IN ROOFING MATERIAL.

Specification forming part of Letters Patent No. 209,830, dated November 12, 1878; Reissue No. 8,546, dated January 21, 1879; Reissue No. 8,671, dated April 15, 1879; application filed March 12, 1879.

*To all whom it may concern:*

Be it known that I, TOBIAS NEW, of the city and State of New York, have invented a new and useful Improvement in Ready-Prepared Roofing, of which the following is a clear, full, and exact description.

My invention relates to that class of roofings known as "portable roofing fabric." This has been made, usually, of two or more thicknesses or layers of paper or felt, commonly saturated and united by bituminous material for cementing them together.

The completed fabric thus made has usually been made in long strips of sufficient length and width to cover one hundred square feet, and is usually twenty-six, twenty-eight, or thirty-two inches wide, which have been rolled, shipped, and marketed in compact rolls; much like carpeting; but the bitumen and bituminous material lack toughness and elasticity, and the portable fabric made from it is liable to crack and break in unrolling and in handling under the influence of constantly-changing temperatures; also, to be sticky, sometimes so much so as to make it impossible to use it.

To overcome these difficulties I use for cement, in place of bitumen or bituminous material, any of the vegetable products of the pine tree, preferring to use the gum or rosin, which is dissolved at a comparatively low temperature, whereby I am enabled to mix with the rosin any fiber—such as wool, hair, or any woody fibers—to give body to the composition and add toughness and elasticity.

To enable others skilled in the art to make and use my invention, I will proceed to describe the exact manner in which I have carried it out.

As already stated, I rely upon the vegetable products of the pine tree, preferring the use of the rosin.

It is well known that after the distillation of the turpentine the residuum is rosin; but between the turpentine proper and the rosin there is a medium product of a liquid or semi-liquid consistency. This is the article I prefer to use, and with this may be mixed a sufficient quantity of the oil of rosin, or any other suitable oil, to secure the best consistency for mixing the fibers prior to its application to the paper or felt, or other material which may be used in preparing the roofing. The rosin, however, may be more convenient for use, and this may be melted and the oil added to secure a product much resembling the product before referred to. The rosin can be brought to a liquid state at a temperature which will not injure the fiber, which is to be introduced, as before stated, to give body, toughness, and elasticity to the composition.

In mixing in the fiber, the proportion should be about from forty to seventy-five per cent. of the fibrous material, according to the circumstances under which the roofing is to be used.

When the composition is ready for application, a strip of paper, preferably saturated paper, known commercially as "roofing-felt," or other material, is coated with a layer of the composition over the whole surface, of any desired thickness. Then another strip of the material, paper, or cloth is laid thereon, and another layer of the composition is added. On this is placed another layer of paper or fabric, and so on until the desired number of layers and thickness are obtained. The whole pile is then subjected to a heavy pressure, firmly uniting all the layers of paper, felt, or other material and composition in one solid and homogeneous mass. This roofing is then cooled and put up in rolls ready for the market.

I do not limit myself, however, to the precise combination of materials heretofore shown.

My invention is limited as respects the main ingredient to vegetable products and to those of the pine; but I may use any of the same, from the heaviest pine-tar to the lightest product of the pine, modified or treated in any way so as to form and remain as a solid.

I may also use a paper or felt saturated in the same vegetable products of the pine, or in any composition of the same; but I prefer the saturated felt or roofing-felt, which, when well cured or dried, is not so objectionable, and, when combined with intermediate layers of the kind of vegetable cement that I have described, works well.

Roofing made according to my invention has great toughness and elasticity without the addition of the fiber or other material; but the addition of such fiber or other material is desirable, as it adds body to the material.

Having thus described my invention, I claim as new and desire to secure by Letters Patent—

As a new article of manufacture, a ready-prepared portable roofing consisting of two or more layers of paper or fabric saturated in any way, as above shown, in combination with layers of vegetable rosin, or of any vegetable product of the pine, prepared as described, and with or without the fiber, and the whole body reduced to a solid mass by pressure, substantially as described.

TOBIAS NEW.

Witnesses:
NATHAN DUFF,
R. B. POWELL.